July 5, 1966 J. A. BLUNT 3,259,746
APPARATUS FOR AUTOMATICALLY WEIGHING AND TOTALIZING THE
PRODUCTION TIME INTERVALS OF A PLURALITY OF DIFFERENT
WEIGHT CATEGORIES OF CIGARETTES DURING MANUFACTURE
Filed Feb. 29, 1960 3 Sheets-Sheet 1

INVENTOR
Julian A. Blunt
BY
Pennie, Edmonds, Morton, Barrows & Taylor
ATTORNEYS

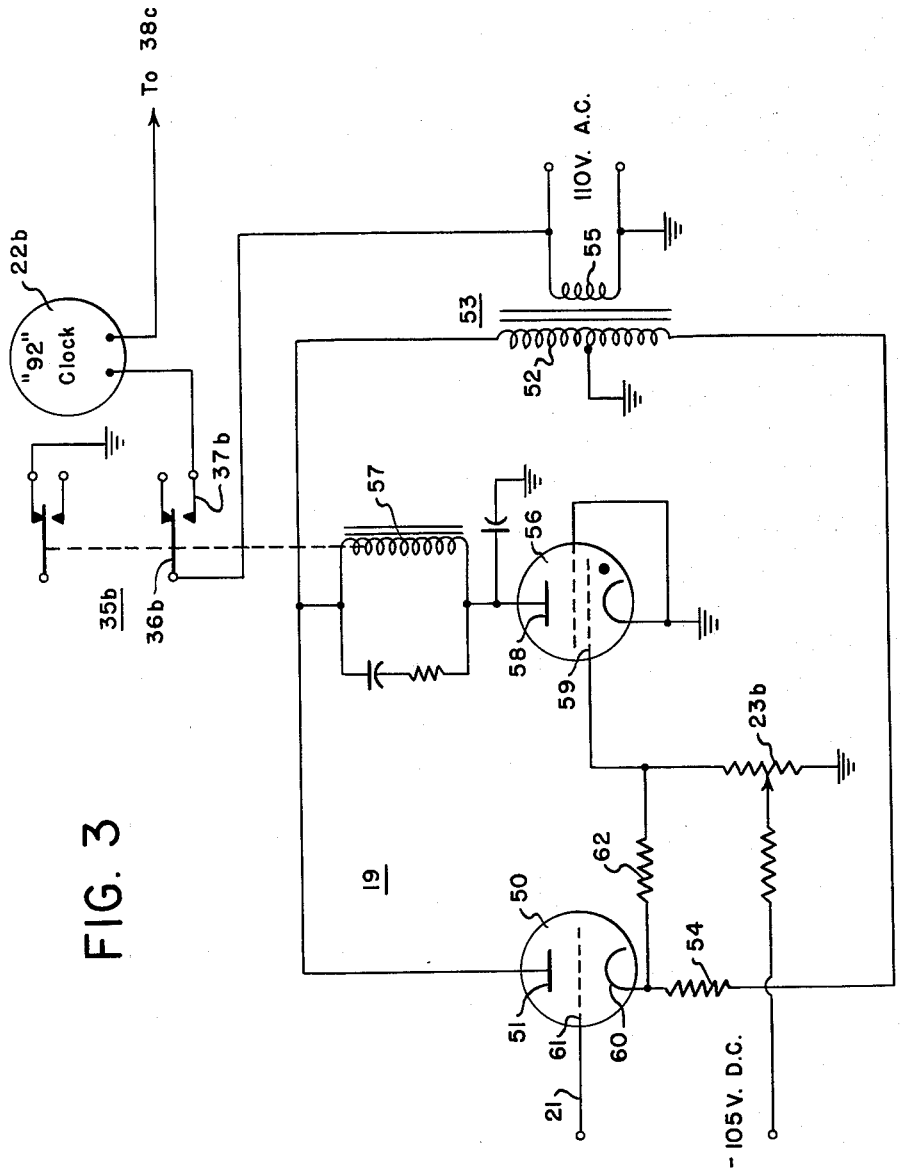

United States Patent Office 3,259,746
Patented July 5, 1966

3,259,746
APPARATUS FOR AUTOMATICALLY WEIGHING AND TOTALIZING THE PRODUCTION TIME INTERVALS OF A PLURALITY OF DIFFERENT WEIGHT CATEGORIES OF CIGARETTES DURING MANUFACTURE
Julian A. Blunt, Louisville, Ky., assignor to The American Tobacco Company, New York, N.Y., a corporation of New Jersey
Filed Feb. 29, 1960, Ser. No. 11,889
3 Claims. (Cl. 250—83.3)

This invention relates to the manufacture of cigarettes and more particularly to apparatus for automatically weighing cigarettes and totalizing the number of manufactured cigarettes which fall into each one of a plurality of different weight categories.

In the production of cigarettes, it is important for the manufacture to maintain careful quality control checks throughout the various stages of manufacture. One cigarette characteristic which has been found to provide a valuable indication of overall quality is that of weight, because the final cigarette weight varies as a function of tobacco moisture content, tobacco density, firmness, etc., all of which have optimum values. Although various systems have been developed for measuring and displaying the instantaneous weight of cigarette rod, none of the known systems provide means for computing or recording the total number of cigarettes which are manufactured in a number of different off-weight categories during a given production time interval. This information is valuable to the production control engineer as an aid to improving overall product uniformity and quality.

Accordingly, it is a primary object of this invention to provide apparatus which will automatically measure the weight of continuously moving cigarette rod and totalize the respective production time intervals devoted to the manufacture of all the cigarettes therefrom in each one of a number of different abnormal or off-weight categories.

Various operational features and advantages of the present invention will be further appreciated by consideration of the following specification in connection with the accompanying drawings, in which:

FIG. 3 is a schematic diagram of a clock switch amplifier.

The instant invention employs a radiation type measuring head for sensing tobacco density in the cigarette rod. Other well-known types can be substituted. A varying D.-C. voltage is developed therefrom which is proportional in amplitude to the weight of the rod under measurement. This voltage is used to actuate one of a plurality of pre-adjusted voltage sensitive switch amplifiers which turn on associated elapsed-time indicating clocks. The switching circuits are arranged and interlocked so that only one clock can operate at a given time. A master clock is advantageously provided to measure the total elapsed time for a given production measuring run. Since rod velocity through the maker machine is maintained substantially constant, the number of cigarettes produced in any given weight category during a given production run can be readily computed from the elapsed time recorded on the clock assigned to the given category.

Figure 1:
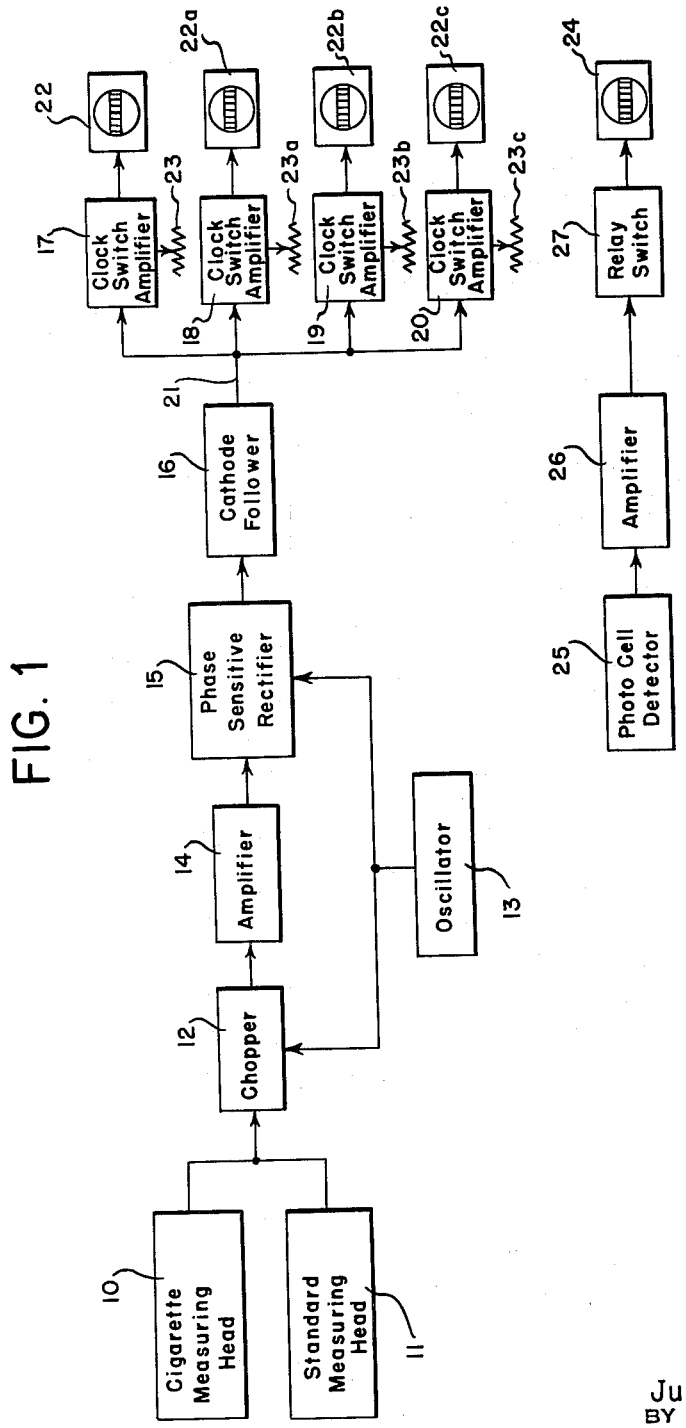
FIG. 1 is a block diagram including the electrical measuring circuits provided by the invention.

Referring to the drawings, FIG. 1 shows a simplified block diagram of the present invention. The current output from a radiation-type cigarette measuring head 10 is differentially compared with the current output from a standard measuring head 11 to develop a weight-measuring voltage. Measurement heads suitable for the present purpose have heretofore been proposed and need not be described in detail. A practical embodiment comprises a suitable source of penetrating rays (e.g., X-ray, beta ray or gamma ray) which are arranged to pass through the cigarette rod and through the desired reference standard, respectively, so that the unabsorbed fractions of the rays impinge upon separate detection means such as ionization chambers. One chamber responds to the unabsorbed rays which pass through the cigarette to be measured, and the other responds to the unabsorbed rays which pass through the standard. Since the radiation sources are alike and the respective detectors are alike, the current outputs of the detectors are measures of the relative densities or weights of the interposed materials. The latter statement is based on the assumption that the moisture content of the tobacco is maintained sufficiently constant, this being standard practice.

The resultant differential current from the compared measuring head outputs is integrated and supplied, as shown, to a chopper 12 which is energized at a desired operating frequency by oscillator 13. The resultant A.-C. output voltage developed by chopper 12 is amplified by A.-C. coupled amplifier 14 and rectified by phase-sensitive rectifier 15. Since rectifier 15 is energized synchronously with chopper 12 by oscillator 13, the resultant output voltage therefrom is a varying D.-C. voltage (±), the amplitude of which is proportional to comparative densities or weights, and the polarity is proportional to comparative sense (i.e., samples lighter or heavier than the standard).

The varying D.-C. measuring voltage produced by rectifier 15 is supplied to cathode-follower 16 which in turn delivers the voltage to a plurality of clock switch amplifiers 17, 18, 19 and 20, via conductor 21. Each amplifier is adapted to energize an associated clock 22, 22a, 22b or 22c whenever the input measuring voltage thereto reaches a predetermined threshold amplitude. The operating threshold voltage of each amplifier is proportional to the adjustable bias voltage pre-set therefor by the respective potentiometer 23, 23a, 23b or 23c.

In a practical operating system, the D.-C. weight-measuring voltage developed at the output of cathode-follower 16 is amplitude-calibrated to correspond to known cigarette weights expressed as the number of cigarettes per 4 ounces of weight, e.g., 92/4 oz., 93/4 oz., 94/4 oz., etc. For convenience these weights will be referred to hereafter as "92" wgt., etc. The bias control on each amplifier is then adjusted so that each amplifier will energize its associated clock at a different threshold voltage, each threshold voltage corresponding to a different off-weight category. Interlock switching is provided so that only one clock can operate at a given time. A detailed explanation of the clock-switching circuits will be described more fully hereinafter in connection with FIGS. 2 and 3.

A master clock 24 is provided to measure total elapsed time involved in a given production measurement run. This clock is switched on and off by a conventional rod monitoring circuit comprising a photo-cell detector 25, an amplifier 26 and a relay-actuated switch 27. The photocell detector is disposed near the maker at a point after the rod has been cut into individual cigarettes. The progression of cigarettes passing before the cell produces an A.-C. voltage as long as individual cigarettes continue to move by on the maker conveyor belt. This voltage is amplified and used to actuate relay switch 27 which turns on the master clock. Thus the master clock only operates when cigarettes are actually being manufactured, so from its indications can be determined the total number of cigarettes made during a given measurement period.

Clocks 22 and 24 are conventional electrically driven time elapsed indicators. Timers made by the Industrial Timer Corporation, Newark, N.J., which record elapsed time in minutes, have been found to be satisfactory for both purposes.

Figure 2:
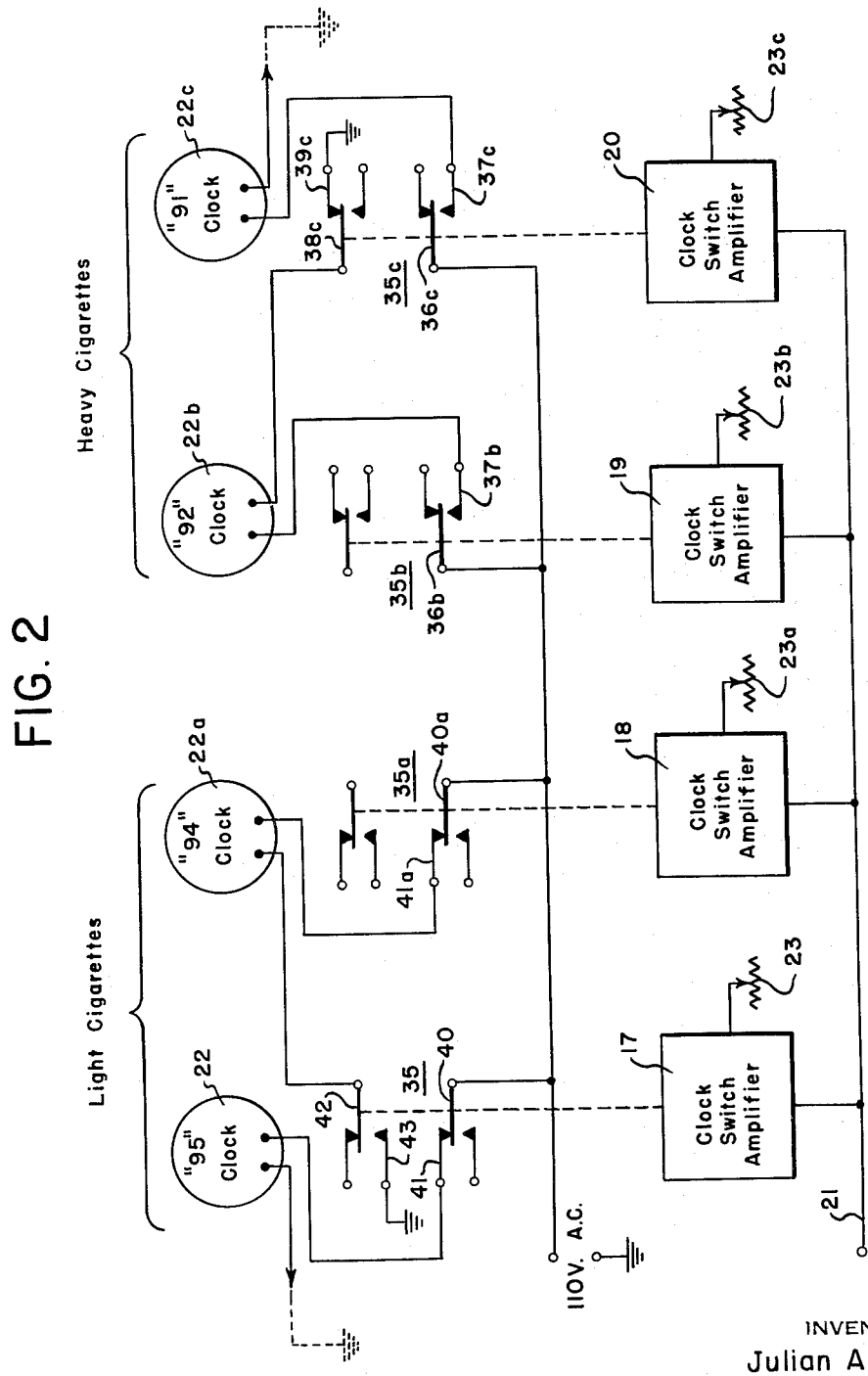
FIG. 2 is a schematic and block diagram showing a preferred embodiment of the clock switching circuits.

A partial schematic diagram of the clock switching circuits provided as a part of the invention is shown in FIG. 2. Identical switch amplifiers 17, 18, 19 and 20 are provided for energizing clocks 22, 22a, 22b and 22c, respectively. For purposes of simplification the amplifier portions of each clock switch are shown in block form whereas the switching contacts associated with each amplifier are shown in schematic form. For explanatory purposes it will be assumed that the desired or normal cigarette weight is "93" and that clocks 22 and 22a are provided for measuring production times of light cigarettes "95" and "94," respectively, whereas clocks 22b and 22c are provided for measuring production times of heavy cigarettes "92" and "91," respectively. It should be noted that in the preferred embodiment no clock is provided for measuring the production time for normal weight cigarettes. Only off-weight production times are totalized. It will be apparent from the discussion that follows that additional clocks may be added to measure any number of different weight categories including the desired normal one.

As shown in the drawing, amplifiers 17–20 are supplied with the calibrated weight measuring voltage via conductor 21. The bias control on each amplifier is pre-set to provide the required threshold of operation corresponding to each selected off-weight category. For explanatory purposes it will be assumed that the weight measuring voltage has an amplitude of +8 volts for normal "93" weight, increasing to +9 volts for "92" weight and +10 volts for "91" weight, and accordingly decreasing to +7 volts and +6 volts for "94" weight and "95" weight, respectively. The above voltages represent the operating thresholds for the respective switch amplifiers 17–20. Whenever the measuring voltage reaches or exceeds the thresold value of an amplifier, that amplifier will actuate its associated double-pole double-throw relay 35, 35a, 35b or 35c, as the case may be. Assuming, for example, that the measuring voltage is +9 volts, relay 35b will be actuated and clock 22b will be energized from the 110 volt A.-C. supply line by contacts 36b and 37b through normally closed contacts 38c and 39c of relay 35c. Clock 22b will continue to run as long as the measuring voltage is greater than +9 volts but less than +10 volts. When the measuring voltage reaches or exceeds +10 volts, relay 35c will be actuated by amplifier 20 whereby clock 22c will be energized by the closing of contacts 36c and 37c and at the same time clock 22b will be turned off by the opening of normally closed contacts 38c and 39c. Thus it will be seen that clock 22b records the production time for cigarettes weighing between "92" and up to but less than "91," while clock 22c records the production time for cigarettes weighing "91" and above.

When normal weight cigarettes (represented by +8 volts) are being manufactured, relays 35 and 35a are actuated by switch amplifiers 17 and 18 and relays 35b and 35c are de-actuated. It should be noted at this point that relays 35 and 35a are respectively connected so as to energize clocks 22 and 22a, respectively, upon de-actuation rather than actuation. Clock 22a is energized from the 110 volt A.-C. power line through normally closed contacts 40a and 41a to ground through contacts 42 and 43 of relay 35 when relay 35 is actuated. Thus only the master clock will continue to run when normal weight cigarettes are being manufactured. When the measuring voltage drops to 7 volts or less, however, relay 35a will be de-actuated and clock 22a will be energized to record the production time for cigarettes weighing more than "95" and up to "94." When the measuring voltage drops down to 6 volts or less, relay 35 will be de-actuated causing clock 22 to be energized through contacts 40 and 41 and at the same time stopping clock 22a with the opening of contacts 42 and 43. Clock 22 will record the production time devoted to the manufacture of cigarettes weighing "95" or less. During the course of operation only one off-weight time totalizer is permitted to operate at a given time due to the described operation of the switching interlock circuits.

Where desired the user may provide a clock for measuring the production time devoted to the manufacture of normal weight cigarettes. In this case the clock relay switching contacts could all be wired in the same manner so that each clock would be energized when its relay is actuated, and de-energized when the next heavier clock is energized (i.e., like relays 35b and 35c).

A schematic diagram of a switch amplifier which has been successfully employed in a practical working system is shown in FIG. 3. This amplifier 19, which may be typical of amplifiers 17–20, includes a triode 50 connected as a cathode follower with the plate 51 connected to one end of second winding 52 of transformer 53 and the cathode through resistor 54 to the opposite end of winding 52. The primary winding 55 is energized with 110 volts A.-C. and the centertap of the secondary winding is grounded as shown. Thyratron 56 is provided to actuate D.P.D.T. relay 35b, the coil 57 thereof being connected in series between plate 58 and one end of secondary winding 52 as shown. The thyratron grip 59 is biased negatively beyond plate-current cutoff by potentiometer 23b. The cathode 60 of tube 50 is connected to grid 59 through resistor 62.

The entire amplifier is energized with A.-C. voltage by transformer 53. When the plate-to-cathode resistance of tube 50 is equal to resistor 54, no A.-C. voltage is developed between thyratron grid 59 and ground, since the equal amplitude push-pull voltages developed therebetween (via the two opposite phase paths) are connected in parallel and hence cancel. As the measuring voltage supplied by line 21 to the control grid 61 of tube 50 is increased in a positive direction, the plate resistance of tube 50 is decreased and the A.-C. voltage developed between the thyratron grid and ground on alternate positive half cycles (when plates 51 and 58 are positive with respect to ground), accordingly increases. When the amplitude of these alternate half cycles is sufficiently great to overcome the negative cut-off bias on the control grid of the thyratron, the thyratron will conduct heavily on alternate half cycles, causing relay 35b to close. Thyratron 56 thereby functions as a voltage-sensitive switch having an adjustable threshold of operation. Amplifiers 17, 18 and 20 shown in FIG. 2 are the same as 19 shown in FIG. 3. The thresholds of operation are all preset by their potentiometers to different levels as described above, and the relay switch contacts are wired as shown in FIG. 2.

Although only four off-weight measuring clocks are shown in the drawings described above, it will be apparent to those skilled in the art that any number of additional clocks can be added to suit the measuring requirements of the user. Furthermore, it will be apparent that for a given instrument sensitivity and gain, the different weight categories totalized by the various clocks can be determined as required by adjustment of the described bias controls.

While only one apparatus according to the invention has been described, it should be understood that the details thereof are not to be construed as limitative of the invention, except insofar as set forth in the following claims.

I claim:
1. In a cigarette maker, means for automatically weighing all cigarettes manufactured in the maker and means for totalizing the respective production time intervals devoted to the manufacture of all cigarettes in each one of a plurality of different predetermined weight categories, said weighing means including a radiation-type density measuring head and circuit means connected thereto for generating a measuring voltage related in amplitude to the amount of tobacco in each of the cigarettes issuing from the maker, an electrically operated elapsed-time indicator for each weight category, a separate switch means for energizing each indicator, and separate switch operating means for each of said separate switches, each of said switch operating means having a separate control input connected at all times to the measuring voltage generating circuit in parallel with each of the other control inputs, each of said switch operating means being selectively operable by said measuring voltage and each having a predetermined different threshold operating voltage corresponding to a separate one of each of said predetermined weight categories.

2. In a cigarette maker, means for automatically weighing all cigarettes manufactured in the maker and means for totalizing the production time intervals devoted to the manufacture of abnormal weight cigarettes, said weighing means including a radiation-type density measuring head and circuit means connected thereto for generating a measuring voltage proportional in amplitude to the amount of tobacco in the cigarettes, a first set of electrically operated elapsed-time indicators for measuring the production times of heavy cigarettes in each one of a plurality of different heavy-weight categories, a second set of electrically operated elapsed-time indicators for measuring the production times of light cigarettes in each one of a plurality of different light-weight categories, a first set of switch means operable by said measuring voltage, one for each of said first set of indicators, and separate switch operating means for each of said first set of separate switches, each of said switch operating means having a separate control input connected at all times to the measuring voltage generating circuit in parallel with each of the other control inputs, each of said first switch operating means being selectively operable by said measuring voltage and having a threshold operating voltage and each having means for adjusting the threshold operating voltage to correspond to a different above-normal amplitude of said measuring voltage, and each of said first switch means being so connected as when operated to simultaneously energize an operatively associated elapsed-time indicator and de-energize an indicator energized by the first switch means having the next lower threshold of operation, a second set of switch means operable by said measuring voltage, one for each of said second set of indicators, and separate switch operating means for each of said second set of separate switches, each of said switch operating means having a separate control input connected at all times to the measuring voltage generating circuit in parallel with each of the other control inputs, each of said second switch operating means being selectively operable by said measuring voltage and having a threshold operating voltage and each having means for adjusting the threshold operating voltage to correspond to a different below-normal amplitude of said measuring voltage, and each of said second switch means being so connected as when operated to simultaneously de-energize an operatively associated elapsed-time indicator and energize an indicator operatively associated with the second switch means having the next higher threshold of operation.

3. Apparatus according to claim 1 including a master clock for measuring total production of time devoted to the production of cigarettes from cigarette rod, and switch means adapted to energize said master clock only when cigarettes are being cut and removed from said rod.

References Cited by the Examiner
UNITED STATES PATENTS

| | | | |
|---|---|---|---|
| 1,805,665 | 5/1931 | Hough | 346—37 X |
| 1,996,189 | 4/1935 | Biro | 265—5 |
| 2,759,108 | 8/1956 | Molins | 250—83.3 |
| 2,763,790 | 9/1956 | Ohmart | 250—83.3 |
| 2,788,896 | 4/1957 | Coleman | 250—83.3 |
| 2,886,714 | 5/1959 | Ewald | 250—83.6 |
| 2,906,456 | 9/1959 | Hudson | 235—92 |
| 2,922,887 | 1/1960 | Jacobs | 250—83.3 |

RALPH G. NILSON, *Primary Examiner.*

J. W. LAWRENCE, *Assistant Examiner.*